US009591161B2

(12) United States Patent
Tagami

(10) Patent No.: US 9,591,161 B2
(45) Date of Patent: Mar. 7, 2017

(54) IMAGE FORMING APPARATUS AND IMAGE FORMING METHOD THAT ADJUST FAINT CHARACTER AND THIN LINE WHEN FUNCTION IS SET TO OFF

(71) Applicant: KYOCERA Document Solutions Inc., Osaka (JP)

(72) Inventor: Yuya Tagami, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/963,112

(22) Filed: Dec. 8, 2015

(65) Prior Publication Data

US 2016/0165083 A1 Jun. 9, 2016

(30) Foreign Application Priority Data

Dec. 8, 2014 (JP) ................................ 2014-247660

(51) Int. Cl.
*H04N 1/00* (2006.01)
*H04N 1/38* (2006.01)
*H04N 1/23* (2006.01)
*H04N 1/387* (2006.01)

(52) U.S. Cl.
CPC ....... *H04N 1/00803* (2013.01); *H04N 1/2338* (2013.01); *H04N 1/38* (2013.01); *H04N 1/3871* (2013.01); *H04N 2201/0094* (2013.01)

(58) Field of Classification Search
CPC .... H04N 1/00803; H04N 1/38; H04N 1/2338; H04N 2201/0094
See application file for complete search history.

(56) References Cited

U.S. PATENT DOCUMENTS

| 2012/0194847 A1* | 8/2012 | Matsuoka | G06K 9/3233 358/1.14 |
| 2014/0376021 A1* | 12/2014 | Nishiyama | H04N 1/00442 358/1.13 |
| 2015/0181064 A1* | 6/2015 | Yabuuchi | H04N 1/00803 358/406 |

FOREIGN PATENT DOCUMENTS

JP H07-321987 A 12/1995

* cited by examiner

*Primary Examiner* — Iriana Cruz
(74) *Attorney, Agent, or Firm* — Hawaii Patent Services; Nathaniel K. Fedde; Kenton N. Fedde

(57) ABSTRACT

Provided is an image forming apparatus that adjusts a thin character, a thin line, or the like, which are read in a manuscript, to become identifiable. The blank paper removing part, when the function is set to ON, removes the image data corresponding to the manuscript detected as a blank paper by the blank paper detecting part. The faint character mode part extract a character from the image data and performs faint character adjustment for the data of the extracted character. The control part, in case that the blank paper removing part is set as OFF, if detected a blank paper by the blank paper detecting part, makes perform image processing accompanied with the faint character adjustment by the faint character mode part to the image processing part.

3 Claims, 3 Drawing Sheets

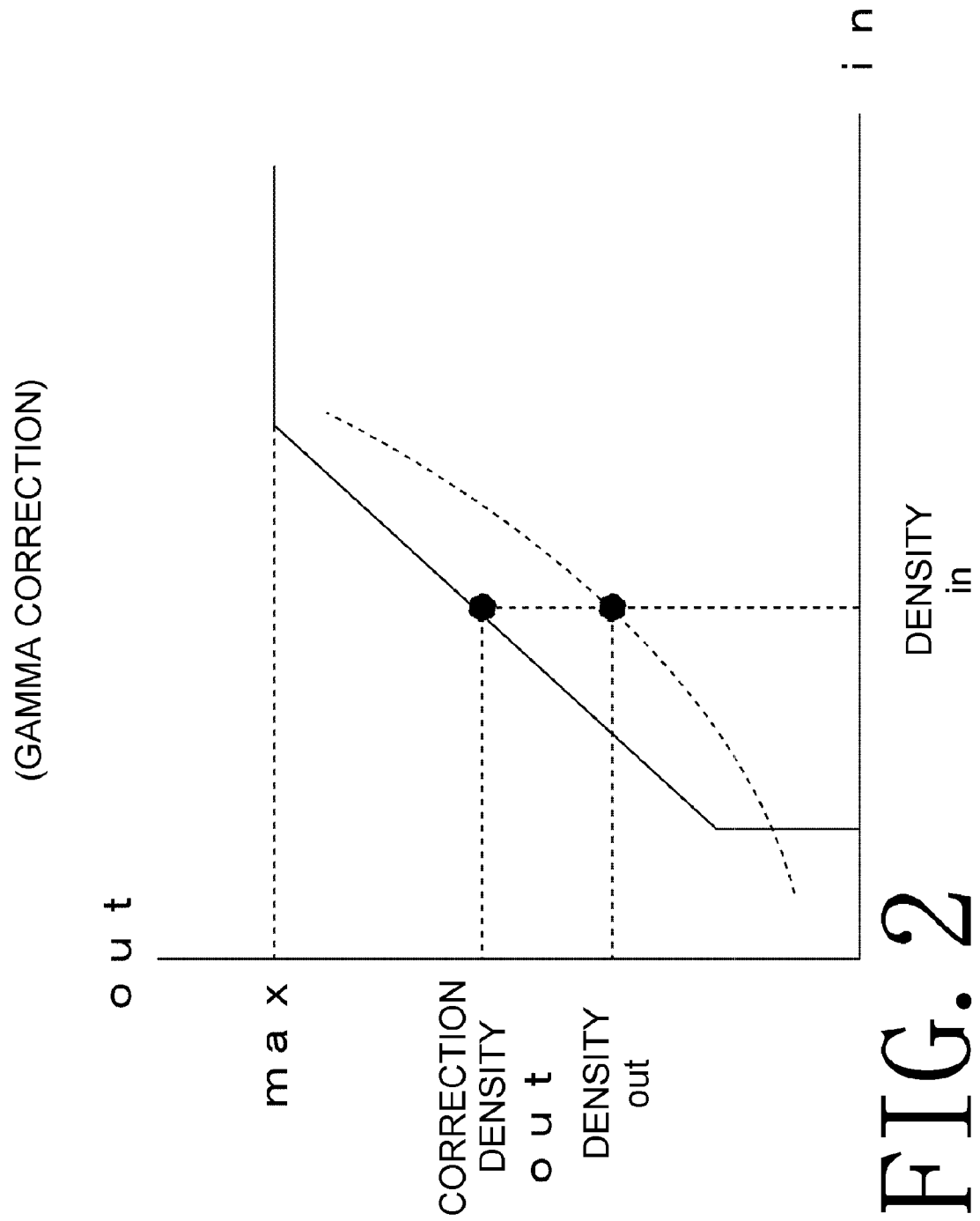

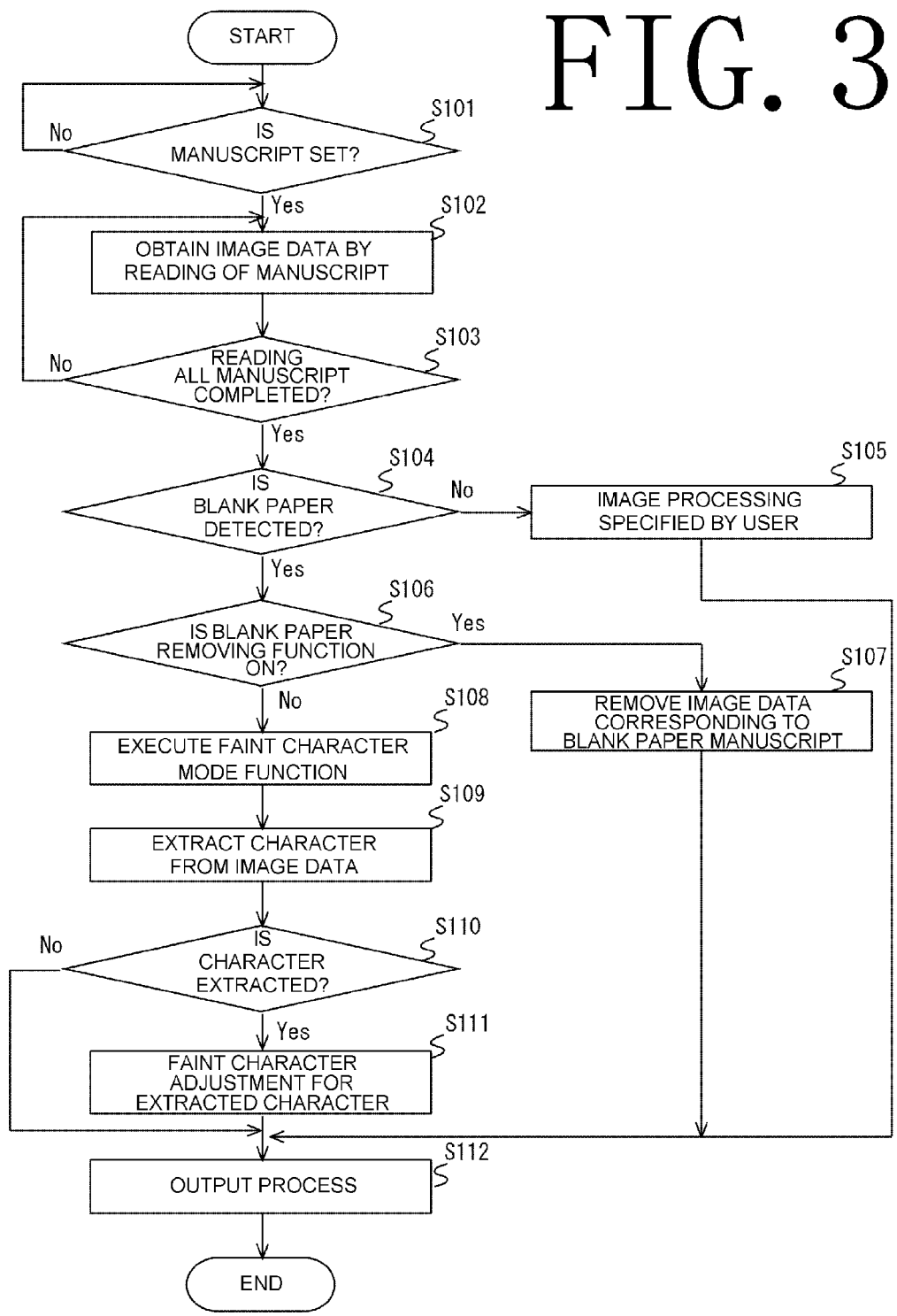

IMAGE FORMING APPARATUS AND IMAGE FORMING METHOD THAT ADJUST FAINT CHARACTER AND THIN LINE WHEN FUNCTION IS SET TO OFF

INCORPORATION BY REFERENCE

This application is based on and claims the benefit of priority from Japanese Patent Application No. 2014-247660 filed on Dec. 8, 2014, the contents of which are hereby incorporated by reference.

BACKGROUND

The present disclosure is related with an image forming apparatus that reads a manuscript and generates image data.

For example, an image forming apparatuses is MFPs (Multifunction Peripheral), such as a printer and a multifunction printer. There are some image forming apparatus that has a blank paper removing function.

The blank paper removing function is a function to remove the image data corresponding to a blank paper if the manuscript read by the scanner part is the blank paper.

A typical case of an image processing apparatus that has such the blank paper removing function is proposed. In this case, by the black data presence or absence determining part, it is determined that there is no black data in the image data of the read manuscript. When respective decision is accomplished, by a means to stop a print out or the like, a print out or the like is stopped.

SUMMARY

An image forming apparatus of the present disclosure is provided with a scanner part, an image processing part, a blank paper detecting part, and a control part. The scanner part reads a manuscript. The image processing part performs image processing for the image data of the read manuscript. The blank paper detecting part detects whether the read manuscript is a blank paper. The control part controls a reading operation by the scanner part, image processing by the image processing part, and a detecting operation by the blank paper detecting part. Also, the image processing part has a blank paper removing part and a faint character mode part. The blank paper removing part removes the image data corresponding to the manuscript detected as a blank paper by the blank paper detecting part when the function is set to ON. The faint character mode part extracts a character from the image data and performs faint character adjustment for the data of the extracted character. The control part, when the blank paper removing part is set to OFF and a blank paper is detected by the blank paper detecting part, performs image processing accompanied with the faint character adjustment by the faint character mode part by the image processing part.

An image forming method of the present disclosure is performed by an image forming apparatus provided with a scanner part, an image processing part, a blank paper detecting part, and a control part. The scanner part reads a manuscript. The image processing part performs image processing for the image data of the read manuscript. The blank paper detecting part detects whether the read manuscript is a blank paper. The control part controls the reading operation by the scanner part, image processing by the image processing part, and the detecting operation by the blank paper detecting part. When the function is set to ON, the image data corresponding to the manuscript detected as a blank paper by the blank paper detecting part is removed. A character is extracted from the image data and faint character adjustment is performed for the data of the extracted character. When the blank paper removing part is set to OFF and a blank paper is detected by the blank paper detecting part, image processing accompanied with the faint character adjustment by the faint character mode part is performed by the image processing part.

BRIEF DESCRIPTION OF THE DRAWINGS

FIG. 2 is a conceptual diagram for explaining an example of faint character adjustment of a character, a thin line, or the like by the faint character mode function of the image processing part in FIG. 1; and FIG. 3 is a chart figure for explaining operation of the image forming apparatus in FIG. 1.

DETAILED DESCRIPTION

Figure 1:
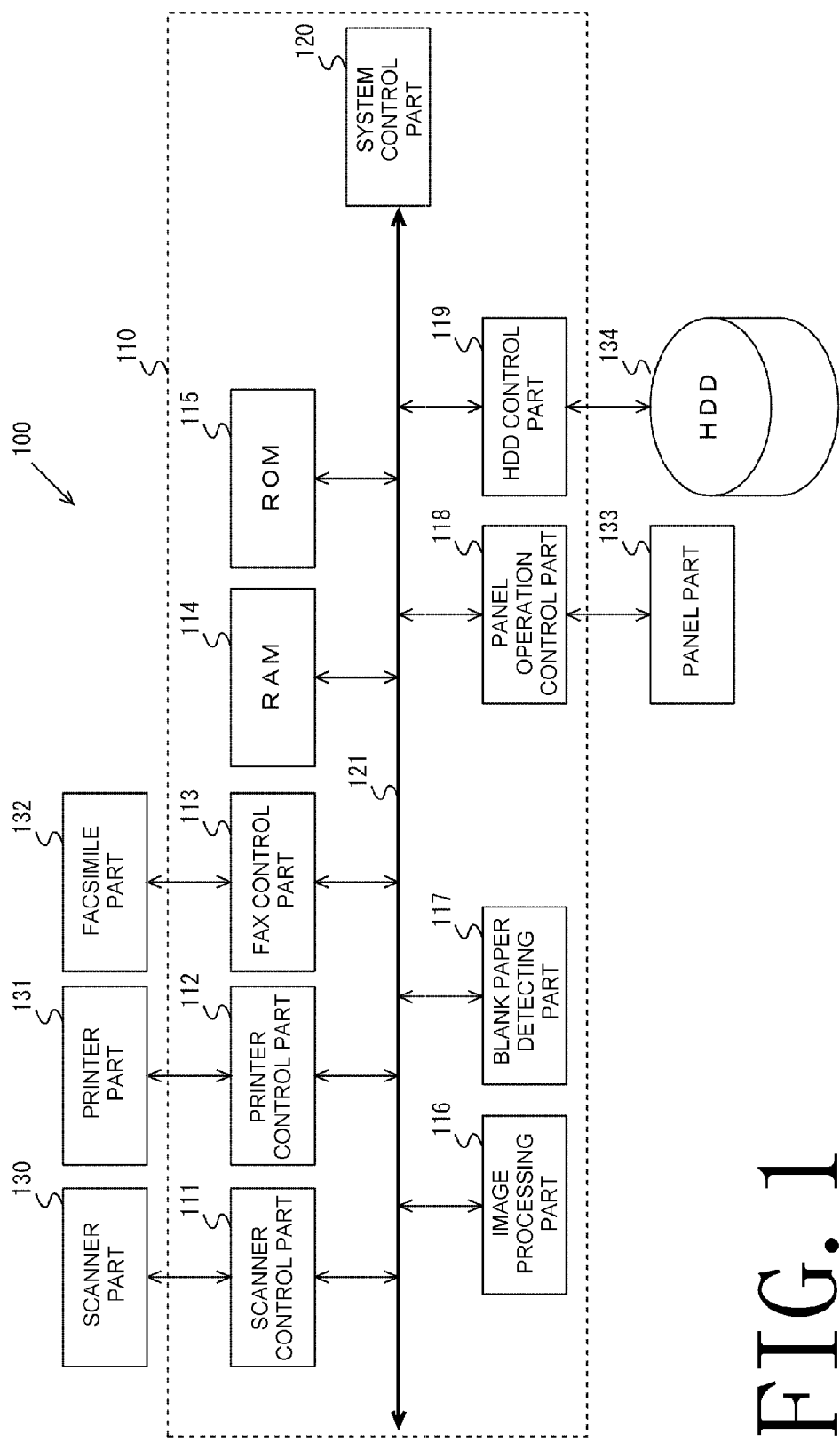
FIG. 1 is a block diagram illustrating an embodiment of the image forming apparatus of the present disclosure.

Hereinafter, an embodiment of the image forming apparatus in the present disclosure is explained, as refer to FIG. 1-FIG. 3. As an example of the image forming apparatus in the following explanation, it is an MFP (Multifunction Peripheral). An MFP is multi-functional peripheral equipment that has a plurality of functions, such as a printer function, a facsimile function, and a scanning function, for example.

Firstly, as shown in FIG. 1, MFP 100 is provided with control-part 110, scanner part 130, printer part 131, facsimile part 132, panel part 133, and HDD (Hard disk drive) 134.

Scanner part 130 inputs image data of the manuscript read by an image sensor into control part 110. That is, scanner part 130 converts the image signal of the manuscript from an image sensor into digital image data and inputs it into control part 110, sequentially.

Printer part 131 prints an image on a paper based on the image data outputted from control part 110. Facsimile part 132 transmits the image data outputted from control part 110 to the facsimile that serves as the other party via a telephone line. Also, facsimile part 132 receives the image data from the other party facsimile and inputs it into control part 110. That is, facsimile part 132 controls connection with the telephone line by NCU (Network Control Unit,) which is not illustrated. Then, facsimile part 132 compresses and modulates the image data outputted from control part 110. Then, facsimile part 132 transmits them to the other party facsimile. Also, facsimile part 132, with connecting the telephone line by NCU, demodulates to the image data from the other party facsimile, decompresses, and inputs them into control part 110.

Panel part 133 displays either selection of a printer function of MFP 100, a facsimile function, or a scanning function, a manual operation button for performing various setup, or the like. Also, an icon, or the like, which tells that failure, or the like, occurred is displayed when failure, or the like, happen for MFP 100.

The application program for providing various functions of MFP 100, or the like, are memorized in HDD 134.

Control part 110 controls operation of MFP 100 as a whole. Control part 110 includes scanner control part 111, printer control part 112, FAX (Facsimile) control part 113, RAM (Random Access Memory) 114, ROM (Read Only Memory) 115, image processing part 116, blank paper detecting part 117, panel operation control part 118, HDD control part 119, and system control part 120. Also, these are connected with data bus 121.

Scanner control part 111 controls the reading operation of scanner part 130. Printer control part 112 controls the printing operation of printer part 131. FAX control part 113 controls the transmitting and receiving operations of the image data by facsimile part 132.

RAM 114 is a work memory for executing a program. The control program, or the like, which perform checking an operation of each part, or the like, is stored in ROM 115. Image processing part 116 performs image processing for the image data of the manuscript read by scanner part 130, for example. That is, for example, when there is designation of FAX transmission via panel part 133, image processing (rasterize) for converting into data needed for FAX transmission is performed. Also, for example, when there is designation of printing via panel part 133, image processing (rasterize) needed for printing is performed.

Also, image processing part 116 has a blank paper removing part and a faint character mode part that are not illustrated. The blank paper removing part and the faint character mode part shows functions. Hereinafter, on account of explanation, the blank paper removing part is regarded as a blank paper removing function and a faint character mode part is regarded as the faint character mode function. About a blank paper removing function, when the manuscript read by scanner part 130 is detected as a blank paper by blank paper detecting part 117, the image data corresponding to the blank paper manuscript is removed. The decision whether or not the manuscript is a blank paper by a blank paper removing function, for example, is based on presence or absence of black data in the image data of the manuscript read by scanner part 130. This blank paper removing function can be set to ON/OFF for the function by operation via panel part 133.

Also, by the faint character mode function, a character (character image) is extracted from the image data read by scanner part 130. Also, by the faint character mode function, for the data of the extracted character image, a density is increased or edge emphasis is performed. Thereby, in the faint character mode function, it adjusts in order that a thin character, a thin line, or the like, can be displayed distinctly. Hereinafter, the function of this adjustment is called faint character adjusting function. In addition, as a method to increase a density, density for the data of the extracted character image may be increased, uniformly. Also, it may pull up to a fixed density for only data of a low-concentration character.

Also, as shown in FIG. 2, a gamma correction may be performed. By the gamma correction, for example, to an input value (density in), an output value (density out) is increased to a fixed correction output value (correction density out) along a correction straight line. In addition, in case that binarization of the image data read by scanner part 130 is performed, the threshold for discriminating the black data of the image data may be decreased from normal threshold. Thereby, even if a character, a thin line, or the like, for the manuscript is thin, a character (character image) can be certainly extracted from the image data read by scanner part 130.

Also, in order to remove a so-called normal noise, which is black data other than the character (character image) included in the image data read by scanner part 130, when low-density data lower than a specific density is needed to be removed, it is preferred to make the threshold for removing low in order that even lower-density data can be extracted.

Blank paper detecting part 117 discriminates the presence or absence of black data for the image data of the manuscript read by scanner part 130. Blank paper detecting part 117 detects as a blank paper if there is no black data. In addition, blank paper detecting part 117 in the present embodiment performs blank paper detection regardless of ON/OFF for the blank paper removing function in image processing part 116.

Panel operation control part 118 controls the display action of panel part 133. HDD control part 119 controls writing, reading, or the like, for data in HDD 134. System control part 120, if the blank paper removing function in image processing part 116 is mainly set to OFF and it is detected as a blank paper by blank paper detecting part 117, controls to operate the faint character mode function in image processing part 116, compulsorily. It describes later for details.

Next, the example of image processing in MFP 100 is explained with reference to FIG. 3.

Firstly, by system control part 120, it is determined whether the manuscript is set or not (Step S101). If the manuscript is not set, it waits setting of the manuscript (Step S101: No). On the other hand, if it is determined that the manuscript is set (Step S101: Yes), scanner part 130 is driven via scanner control part 111 by system control part 120. Then, image data is obtained by system control part 120 for reading of the manuscript (Step S102).

Subsequently, it is determined whether reading for all the manuscripts is completed by system control part 120 (Step S103). If reading for all the manuscripts is not completed (Step S103: No), it returns to Step S102. Then, image data is obtained by reading of the next manuscript.

If reading for all the manuscripts is completed (Step S103: Yes), by system control part 120, it is determined whether or not blank paper detecting part 117 detects the blank paper (Step S104). If blank paper detecting part 117 does not detect the blank paper (Step S104: No), image processing part 116 is executed by control by system control part 120. Then, image processing specified by the user is performed (Step S105).

About image processing specified by the user in this case, for example, if adjustment, processing, editing, or all of them are set via panel part 133, it is performed the process for the read image data as the indication.

On the other hand, if blank paper detecting part 117 is detecting the blank paper (Step S104: Yes), by system control part 120, it determines whether the blank paper removing function in image processing part 116 is or is not OFF (Step S106). Here, if the blank paper removing function in image processing part 116 is ON, the image data that corresponds to a blank paper manuscript is removed by image processing part 116 (Step S107).

On the other hand, if the blank paper removing function of image processing part 116 is OFF (Step S106: Yes), the faint character mode function of image processing part 116 works, compulsorily, by system control part 120 (Step S108).

By the faint character mode function, extraction of a character (character image) is performed for the image data read by scanner part 130 (Step S109). Here, if extraction of a character (character image) is performed (Step S110: Yes), for the data of the extracted character (character image), a density is increased or edge emphasis is performed. Thereby, faint character adjustment is performed in order that a thin character, a thin line, or the like, can be displayed, distinctly (Step S111).

On the other hand, if extraction of a character (character image) is not performed (Step S110: No), a character, a thin line, or the like is not written in the manuscript. Then, in case that extraction of the character (character image) is not performed in Step S110, or in case that faint character adjustment in Step S111 or image processing specified by the user in Step S105 is completed, the output process by image processing part 116 is performed (Step S112).

As output process here, for example, if there is designation of FAX transmission via panel part 133, image processing (rasterizing) for converting into data needed for FAX transmission is performed. Also, for example, if there is designation of printing via panel part 133, image processing (rasterizing) needed for printing is performed.

Thus, in the present embodiment, system control part 120 as a control part, when the blank paper removing function (blank paper removing part) in image processing part 116 is set to OFF, if detected as a blank paper by blank paper detecting part 117, image processing accompanied with faint character adjustment by the faint character mode function (faint character mode part) in image processing part 116 is performed.

Thus, when the blank paper removing function (blank paper removing part) of image processing part 116 is set to OFF, image processing accompanied with the faint character adjustment by the faint character mode function (faint character mode part) in image processing part 116 is performed. Therefore, a thin character, a thin line, or the like, which are read from the manuscript can be adjusted in order to become identifiable.

Also, according to the present embodiment, when the faint character adjustment by a faint character mode function (faint character mode parts) is performed, increasing a density, performing edge emphasis, or performing a gamma correction for the data of the character extracted from image data. Therefore, even if a character, a thin line, or the like, in a manuscript is thin, a character (character image) can be certainly-extracted for the image data read by scanner part 130.

As the above-mentioned is summarized, in the image processing apparatus of the typical case as mentioned above, when there is no black data in image data, the read manuscript is determined to be a blank paper. Then, a printing out, or the like, is stopped. Therefore, the increase in the amount of consumption of an archival paper, or the like, is suppressed.

Incidentally, such an image processing apparatus, for example, when sending the set manuscript by FAX transmission, certainly, it is necessary to turn off the blank paper removing function. That is, if the blank paper removing function is turned ON, when characters, narrow lines, or the like, in either of the set manuscript is thin, it is determined that there is no black data in the image data for the read manuscript depending on a case. Then, the read manuscript may be determined to be the blank paper. In this case, transmission of the image data of the manuscript, which is determined as the blank paper because of a character, a narrow line, or the like, being thin, is no longer performed. Therefore, it is necessary to turn off the blank paper removing function.

Meanwhile, if a blank paper removing function is turned OFF and FAX transmission is performed, it becomes possible to send the set manuscript, certainly. However, if image processing, such as binarization processing, is performed directly about the thin image data, such as a character and a narrow line, in a receiving side, discrimination of a thin character, a narrow line, or the like, becomes impossible. Also, in the worst case, a thin character, a narrow line, or the like, is disappear.

As compared with this, according to the image forming apparatus in the present disclosure, when the blank paper removing part in the image processing part is set to OFF and is detected as a blank paper by the blank paper detecting part, image processing accompanied with the faint character adjustment by the faint character mode part in an image processing part is made to be performed. Therefore, a thin character, a thin line, or the like, which are read in the manuscript can be adjusted in order to become identifiable.

What is claimed is:

1. An image forming apparatus comprising:
   a scanner part that reads a manuscript;
   an image processing part that performs image processing for image data of a read manuscript;
   a blank paper detecting part that detects whether the read manuscript is a blank paper; and
   a control part that controls reading operation by the scanner part, image processing by the image processing part, and detects operation by the blank paper detecting part, wherein
   the image processing part has
   a blank paper removing part that removes the image data corresponding to the manuscript detected as a blank paper by the blank paper detecting part when a blank paper removing function is set to ON, and does not remove the image data corresponding to the manuscript detected as a blank paper by the blank paper detecting part when the blank paper removing function is set to OFF, and
   a faint character mode part that extracts a character from the image data and performs faint character adjustment for data of an extracted character; and
   the control part,
   when the blank paper removing function is set to ON and the blank paper is detected by the blank paper detecting part, does not make the image processing part perform image processing accompanied with the faint character adjustment by the faint character mode part, and
   when the blank paper removing function is set to OFF and the blank paper is detected by the blank paper detecting part, makes the image processing part perform image processing accompanied with the faint character adjustment by the faint character mode part the.

2. The image forming apparatus according to claim 1, wherein
   the faint character adjustment by the faint character mode part is increasing a density for the data of the character extracted from the image data, performing edge emphasis, or performing a gamma correction.

3. An image forming method performed by an image forming apparatus having
   a scanner part that reads a manuscript,
   an image processing part that performs image processing for image data of a read manuscript,
   a blank paper detecting part that detects whether the read manuscript is a blank paper,
   a control part that controls reading operation by the scanner part, image processing by the image processing part, and detects operation by the blank paper detecting part, comprising the steps of:

removing, when a blank paper removing function is set to ON, the image data corresponding to the manuscript detected as a blank paper by the blank paper detecting part;

not removing, when the blank paper removing function is set to OFF, the image data corresponding to the manuscript detected as a blank paper by the blank paper detecting part, not performing, when the blank paper removing function is set to ON and the blank paper is detected by the blank paper detecting part, image processing accompanied with a faint character adjustment for data of an extracted character extracted from the image data by the image processing part, and performing, when the blank paper removing function is set to OFF and a blank paper is detected by the blank paper detecting part, image processing accompanied with the faint character adjustment for data of an extracted character extracted from the image data by- the image processing part.

* * * * *